US008411564B2

(12) United States Patent
Saraph et al.

(10) Patent No.: US 8,411,564 B2
(45) Date of Patent: Apr. 2, 2013

(54) ARCHITECTURAL FRAMEWORK OF COMMUNICATION NETWORK AND A METHOD OF ESTABLISHING QOS CONNECTION

(75) Inventors: Girish Prabhakar Saraph, Mumbai (IN); Rajesh Bhalchandra Joshi, Mumbai (IN)

(73) Assignee: Indian Institute of Technology, Bombay, Mumbai (IN)

( * ) Notice: Subject to any disclaimer, the term of this patent is extended or adjusted under 35 U.S.C. 154(b) by 334 days.

(21) Appl. No.: 12/808,803

(22) PCT Filed: Dec. 17, 2008

(86) PCT No.: PCT/IN2008/000841
§ 371 (c)(1),
(2), (4) Date: Aug. 6, 2010

(87) PCT Pub. No.: WO2009/087671
PCT Pub. Date: Jul. 16, 2009

(65) Prior Publication Data
US 2011/0058563 A1 Mar. 10, 2011

(30) Foreign Application Priority Data
Dec. 17, 2007 (IN) .......................... 2471/MUM/2007

(51) Int. Cl.
*G01R 31/08* (2006.01)
(52) U.S. Cl. .......................... 370/230; 370/231; 370/236
(58) Field of Classification Search .......................... None
See application file for complete search history.

(56) References Cited

U.S. PATENT DOCUMENTS

| | | | | |
|---|---|---|---|---|
| 6,584,093 | B1* | 6/2003 | Salama et al. | 370/351 |
| 6,985,447 | B2* | 1/2006 | Gibson et al. | 370/255 |
| 7,197,038 | B1 | 3/2007 | Cook | |
| 7,808,972 | B2* | 10/2010 | Zhang | 370/351 |
| 2002/0085556 | A1* | 7/2002 | Hong | 370/389 |
| 2002/0181462 | A1 | 12/2002 | Surdila et al. | |
| 2006/0198308 | A1* | 9/2006 | Vasseur et al. | 370/238 |
| 2007/0208871 | A1* | 9/2007 | Vasseur et al. | 709/230 |
| 2009/0177266 | A1* | 7/2009 | Powell et al. | 623/1.13 |
| 2011/0058563 | A1* | 3/2011 | Saraph et al. | 370/401 |

FOREIGN PATENT DOCUMENTS

EP          1091526          4/2001

OTHER PUBLICATIONS

International Search Report dated Sep. 21, 2009 for related International Application No. PCT/IN2008/000841.
Postel, et al., "Telnet Protocol Specification", Network Working Group Request for Comments: 854, May 1983, pp. 1-15.
Case, et al, "A Simple Network Management Protocol (SNMP)", Network Working Group Request for Comments: 1157, May 1990, pp. 1-36.

(Continued)

*Primary Examiner* — Robert Wilson
(74) *Attorney, Agent, or Firm* — Klein, O'Neill & Singh, LLP

(57) ABSTRACT

Disclosed herein are an architectural framework (1) of a communication network and a method of establishing QoS connection in a communication network. The architectural framework comprises of a plurality of Autonomous Systems (ASs) (2,3,4,11) connected to one another, each AS (2,3,4,11) being optionally connected to one or more users (5,6) and comprising at least one AS Designated Quality of Service Provider Entity (ADE) (7) and at least one gateway (8) communicating with the respective ADE (7).

27 Claims, 3 Drawing Sheets

OTHER PUBLICATIONS

Durham, et al., "The COPS (Common Open Policy Service) Protocol" Network Working Group Request for Comments: 2748, Jan. 2000, pp. 1-38.

Hancock, et al., Next Steps in Signaling (NSIS): Framework, Network Working Group Request for Comments: 4080, Jun. 2005, pp. 1-49.

* cited by examiner

ARCHITECTURAL FRAMEWORK OF COMMUNICATION NETWORK AND A METHOD OF ESTABLISHING QOS CONNECTION

CROSS-REFERENCE TO RELATED APPLICATION

This application is a national phase filing, under 35 U.S.C. §371(c), of International Application No. PCT/IN2008/000841, filed Dec. 17, 2008, the disclosure of which is incorporated herein by reference in its entirety.

FIELD OF THE INVENTION

This invention relates to an architectural framework of a communication network and a method of establishing a Quality of Service connection communication network This invention more particularly relates to an architectural framework of a public communication network and a method of establishing a Quality of Service connection in the public network.

BACKGROUND OF THE INVENTION

Over the years there has been a remarkable growth in the traffic in the public communication network (internet). Newer services which require high bandwidth such as voice and video over Internet Protocol (IP), video-on-demand or IP television are being introduced over the public communication networks. The resulting heavy bandwidth usage leads to heavy traffic on the public communication network thereby exerting tremendous pressure on its existing infrastructure and a degraded performance for all. Owing to such circumstances, applications and services which require end to end Quality of Service (QoS) connections cannot be offered on public communication network. Conventionally, high end services and applications such as real time supply chain and resource management or video conferencing across geographical boundaries which require end to end Quality of Service (QoS) connections are being provided through VPN (Virtual Private Networks), dedicated Virtual Connections (VCs) or dedicated MPLS tunnels in spite of a wide spread availability and reach of public communication networks. Establishing an end to end QoS connection through a network other than a public communication network, especially across geographical boundaries, is complicated and expensive. Establishing an end to end QoS connection over the public communication network with the above architectures and methods is not feasible owing to a number of reasons such as the difference in the underlying technology being used by each Autonomous System in a network, absence of universally adopted definition of QoS which every AS would agree to provide or absence of collaboration and agreement between different service providers with respect to the exchange of reachability information.

OBJECTS OF THE INVENTION

An object of the invention is to provide an architectural framework of a communication network for establishing an end to end QoS connection which is technologically independent and can be easily blended into the existing infrastructure of a communication network.

Another object of the invention is to provide a method of establishing an end to end Quality of Service (QoS) connection over a communication network.

DETAILED DESCRIPTION OF THE INVENTION

According to the invention there is provided an architectural framework of a communication network comprising a plurality of Autonomous Systems (ASs) connected to one another, each AS being optionally connected to one or more users and comprising at least one AS Designated Quality of Service Provider Entity (ADE) and at least one gateway communicating with the respective ADE, each AS communicating with another AS through the respective gateways, each ADE being technologically independent and having information of the resources allocated in the respective AS and being designed to initiate and establish a data path set up within the respective AS through the respective gateways based on the underlying technologies of said gateway and a pre-defined set of Quality of Service (QoS) requirements, an ADE of the first AS being designed to enquire with the rest of the ADEs upon a signal from a user for deciding and establishing an optimum path of data flow from the user of the first AS to another user of another AS, the said optimum path satisfying the predefined set of QoS requirements.

According to the invention there is also provided an architectural framework of a communication network comprising a plurality of Autonomous Systems (ASs) connected to one another, each AS being optionally connected to one or more users and comprising at least one AS Designated Quality of Service Provider Entity (ADE), at least one gateway communicating with the respective ADE and at least one node communicating with at least one gateway, each AS communicating with another AS through the respective gateways, each ADE being technologically independent and having information of the resources allocated in the respective AS and being designed to initiate and establish a data path set up within the respective AS through the respective nodes and gateways based on the underlying technologies of said nodes and gateways and a pre-defined set of Quality of Service (QoS) requirements, an ADE of the first AS being designed to enquire with the rest of the ADEs upon a signal from a user for deciding and establishing an optimum path of data flow from the user of the first AS to another user of another AS, the said optimum path satisfying the predefined set of QoS requirements.

According to an embodiment of the invention the first and last ASs are connected to users and an ADE of the first AS is designed to enquire with the rest of the ADEs upon a signal from the said respective user for deciding and establishing an optimum path of data flow from the user of the first AS to the user of last AS, said optimum path satisfying the pre-defined set of QoS requirements.

According to the invention there is also provided a method of establishing an end to end Quality of Service (QoS) connection in a in a communication network of a plurality of Autonomous Systems (ASs) connected to one another, each AS being optionally connected to one or more users, said method comprising the steps of: providing each AS with at least one technologically independent AS Designated Quality of Service provider Entity (ADE) and at least one gateway, the said ADE having information of the resources being allocated to the respective AS; signaling the ADE of one of the ASs by the user for determining an optimum path of data flow from the said ADE to another ADE through the respective gateways satisfying a pre-defined set of Quality of Service (QoS) parameters; and iii) reserving and establishing said determined path of data flow based on the underlying technologies of the gateways and said pre defined QoS parameters.

According to the invention there is also provided a method of establishing an end to end Quality of Service (QoS) connection in a in a communication network of a plurality of Autonomous Systems (ASs) connected to one another, each AS being optionally connected to one or more users, said method comprising the steps of providing each AS with at least one technologically independent AS Designated Quality of Service provided Entity (ADE), at least one gateway and a node, the ADE having information of the resources being allocated to the respective AS; signaling the ADE of the ASs by the user for determining an optimum path of data flow from the said ADE to the last ADE through their respective gateways satisfying a pre-defined set of Quality of Service (QoS) parameters; reserving and establishing said determined path of data flow based on the underlying technologies of the gateways and nodes and said pre defined QoS parameters.

The following is a detailed description of the invention with reference to the accompanying drawings, in which.

Figure 1:
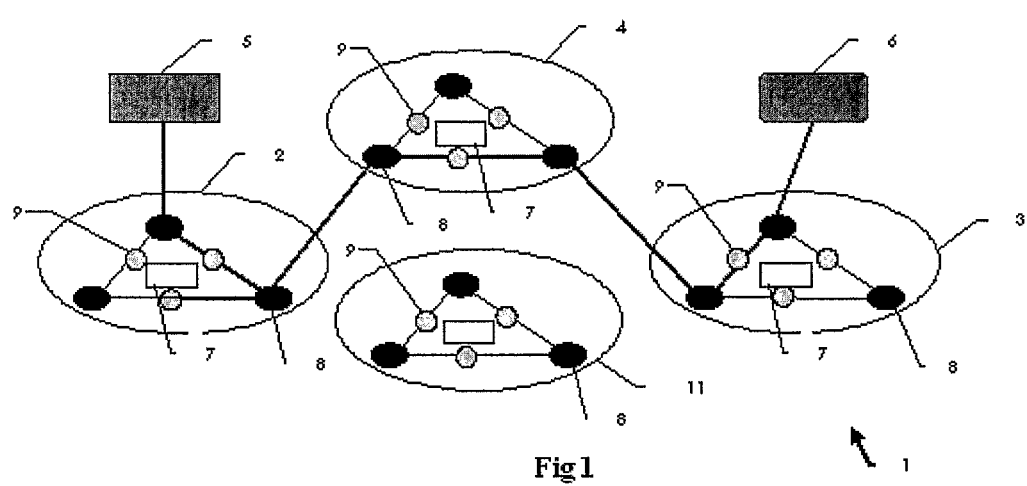
FIG. 1 illustrates an architectural framework of a communication network depicting an end to end QoS connection therein.

FIG. 1 illustrates an architectural framework of a communication network depicting an end to end QoS connection therein. The architectural framework 1 includes a first 2 and a last 3 AS with a plurality of intermediate ASes 4 & 11 connected between them. Each of the first 2 and last 3 ASes are connected to an end user 5 & 6 respectively. Each AS comprises of an AS Designated Quality of Service Provider Entity (ADE) 7, three gateways 8 communicating with the ADE 7 and three nodes 9, each communicating with two gateways 8. Each ADE 7 is a technologically independent entity of the AS capable of directly communicating with the ADEs 7 of other ASes as well as with the gateways 8 and nodes 9 of its own AS 2, irrespective of the underlying technology therein. Two adjacent ASes 2 & 4 communicate with each other through their respective gateways 8. The ADE 7 is usually a computer server modeled as an extension of Routing Control Platform (RCP) concept adapted to store and exchange information with the other ADEs of the other ASes using protocols such as Next Steps in Signaling (NSIS) Proxy and/or NSIS Entity. Such information may include QoS reachability and signaling information as well as the information of the resources pertaining to the gateways 8 and the nodes 9 allocated to the respective AS. The ADEs 7, upon a signaling from the user 5, are designed to enquire (pre-provision), initiate and establish an optimum data path from the first AS 2 to the last AS 3 through their respective gateways and nodes, satisfying a pre-defined and pre decided set of QoS parameters for establishing an end to end QoS session. The user 5 communicates with the ADE 7 through the gateways 8. Gateways 8 are usually routers having an IP/MPLS support, ATM switches, frame relays or layer 3 switches and communicates with the ADE 7 using various protocol mechanisms such as Common Open Policy Service (COPS) Protocol, Simple Network Management Protocol (SNMP) or Telecommunications Network (Telnet) Protocol etc. Gateways 8 communicate with other gateways 8 in the same AS or across AS using standard Multiprotocol Label Switching (MPLS)/Internet Protocol (IP) technology dependent mechanism. Nodes 9 are usually routing nodes along the data path within the AS. Routing nodes 9 do not communicate across AS boundaries. Routing nodes 9 assist gateways in the gateway to gateway path set up within the AS. Routing nodes participate in signaling as well as data forwarding. There may or may not be routing node in an AS. ADEs 7 communicate (Technology Dependent Control messages) with gateways and not with routing nodes. Gateways 8 initiate path control messages to routing nodes 9 using protocols like MPLS.

Figure 2:
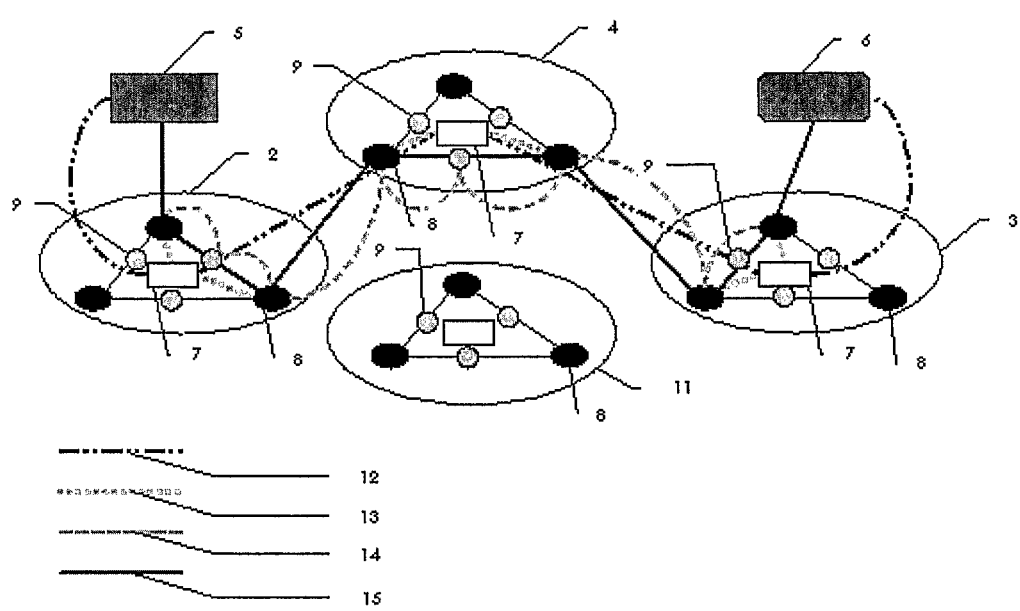
FIG. 2 illustrates a layered structure of an end to end QoS connection in a network of Autonomous Systems (AS).

FIG. 2 illustrates a layered structure of an end to end QoS connection in a network of Autonomous Systems (AS). The user 5 initiates a new QoS connection to be established with user 6, satisfying a pre-defined set of QoS parameters, by signaling the first ADE 7 of the first AS 2 to which it is connected. The first ADE 7 is in turn communicates with various intermediate ADEs to decide and establish the optimum data path available till the last ADE 7 of the last AS 6 satisfying the pre-defined set of QoS parameters. This technology independent layer of the path between end users 5 & 6 through the respective ADEs 7 of each ASes is termed as session control plane 12. Subsequently after determining the ADE-ADE path, a technology dependent layer termed as Control plane for ADEs 13 is initiated wherein ADEs 7 and gateways 8 of the respective ASes participate. Subsequently, another technology dependent layer termed as Control plane for gateways 14 is initiated wherein gateways 8 and routing nodes 9 participate to establish a data flow path between the gateways and nodes of the respective AS. Finally, data forwarding plane 15 is initiated to establish the end to end dataflow path between the users 5 & 6 through the gateways 8 and nodes 9 of the respective ASes participating in the path.

Figure 3:
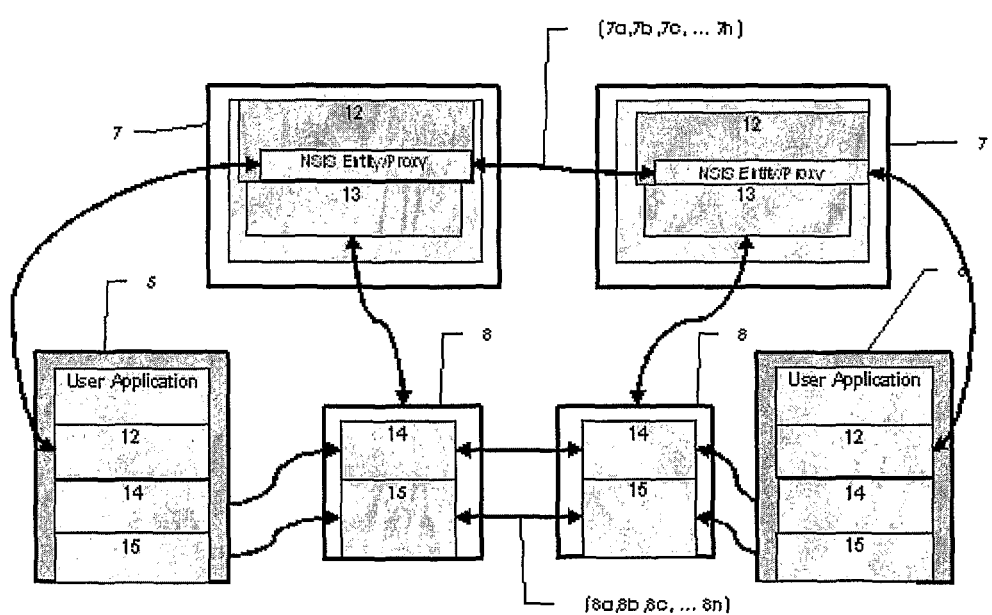
FIG. 3 illustrates a block diagram of the architectural framework comprising of network of Autonomous Systems (AS). for establishing an end to end QoS connection in a communication network.

FIG. 3 illustrates a block diagram of the architectural framework comprising of network of Autonomous Systems (AS) for establishing an end to end QoS connection in a communication network. The user 5 initiates a new QoS connection, i.e. session control plane 12, satisfying a pre-defined set of QoS parameters by signaling the first ADE 7 of the first AS 2 to which it is connected, Signaling is achieved by means of a Session initiation protocols (SIP) which uses Session Description Protocol (SDP) parameters to define QoS requirements. The use of SIP protocol also enables to authenticate, authorize and account the user for initiating and using the QoS connection. Such is useful in billing the user 5 for using the QoS connection. The first ADE 7 in turn refers to its network reachability database and communicates with various intermediate ADEs (7a, 7b, 7c, 7n) to decide and establish the optimum data path available till the last ADE 7 of the last AS 3 satisfying the pre-defined set of QoS parameters. Next Steps in Signaling (NSIS) entity/NSIS proxy implemented in ADEs and uses NSIS protocol for communicating with each other. ADE can select the most suited path when multiple paths exist. The ADEs (7, 7a, 7b, 7c, 7n, 7) in ADE to ADE path verify that there are sufficient QoS resources available within their respective ASes by triggering the first gateway 8 in the path of their respective ASes. As shown in FIG. 3, for this purpose, the control plane for ADEs 13 is initiated wherein ADEs (7a, 7b, 7c, 7n) and gateways 8 of the respective ASes participate. In a subsequent step, a gateway 8 in each AS tries to establish the path at gateway 8 level by standard technology dependent QoS mechanism to satisfy the QoS requirements. As shown in FIG. 3, for this purpose, the technology dependent layer termed as Control plane for gateways 14 is initiated wherein gateways 8 and routing nodes 9 participate to establish a data flow path between the gateways 8 and nodes 9 of the respective AS. The first gateway 8 communicates the success or failure to the respective ADEs (7, 7a, 7b, 7c, 7n). Each ADE 7 then forwards the request to subsequent ADEs (7a, 7b, 7c, 7n) in the path. After the entire verification, typically termed as Connection Admission Control (CAC), is complete, the last ADE 7 sends a final acknowledgement upon which the QoS path is reserved for the user application at each ADE (7, 7a, 7b, 7c, 7n, 7) in the path. The ADEs (7, 7a, 7b, 7c, 7n, 7) then stitch the path segments together to form an end-to-end virtual connection for forwarding the data. Finally, the data forwarding plane 15 is initiated to establish the end to end QoS connection between the users 5 & 6.

According to the invention, the architectural framework and method for establishing an end to end Quality of Service (QoS) connection is independent of underlying network technologies and supports arbitrary mix of diverse QoS technologies or future changes in them. The invention also enables connection establishment, admission control and aggregation at inter-domain level. It enables an optimal use of network resources while supporting multiple services thereby encouraging a viable business model among different network providers to achieve collaboration to support end-to-end QoS connections over shared networks.

Although the invention has been described with reference to a specific embodiment, this description is not meant to be construed in a limiting sense. Various modifications of the disclosed embodiment, as well as alternate embodiments of the invention, will become apparent to persons skilled in the art upon reference to the description of the invention. It is therefore contemplated that such modifications can be made without departing from the scope of the invention as defined in the appended claims.

The invention claimed is:

1. A communication network comprising:
a plurality of autonomous systems including at least a first autonomous system and a last autonomous system, each of the autonomous systems includes a designated quality-of-service provider entity and a plurality of gateways configured to communicate with the designated quality-of-service provider entity;
wherein the autonomous systems are interconnected through the gateways, the first autonomous system is connected to a first user, and the last autonomous system is connected to a second user;
wherein each designated quality-of-service provider entity is a technology-independent entity, and communicates with users and other quality-of-service (QoS) provider entities for establishing QoS-sessions having technology independent QoS parameters;
wherein each designated quality-of-service provider entity has information of resources in its respective autonomous system, and each designated quality-of-service provider entity is configured to initiate and establish a data path within its respective autonomous system through the gateways of its respective autonomous system based on underlying technologies of the gateways and a predefined set of quality-of-service requirements; and
wherein the designated quality-of-service provider entity of the first autonomous system is further configured, upon receipt of a signal from the first user, to inquire of the designated quality-of-service provider entities of other autonomous systems to determine and establish a path for data flow from the first user to the second user satisfying the pre-defined set of quality-of-service requirements.

2. The communication network of claim 1, wherein each autonomous system further comprises a plurality of nodes, each of the nodes being coupled to at least one of the gateways; and
wherein each designated quality-of-service provider entity is further configured to initiate and establish a data path within its respective autonomous system through the gateways and the nodes of its respective autonomous system based on underlying technologies of the gateways and the nodes and the pre-defined set of quality-of-service requirements.

3. The communication network of claim 2, wherein at least one of the nodes is a router.

4. The communication network of claim 2, wherein each designated quality-of-service provider entity communicates with the nodes of its respective autonomous system through the gateways of its respective autonomous system.

5. The communication network of claim 1, wherein at least one of the designated quality-of-service provider entities is a computer server.

6. The communication network of claim 1, wherein the first autonomous system and the last autonomous system are associated with different network providers.

7. The communication network of claim 1, wherein at least one of the gateways is selected from the group consisting of a router having Multiprotocol Label Switching/Internet Protocol support, an ATM switch, a frame relay, and a layer 3 switch.

8. The communication network of claim 1, wherein the first user is connected to one of the gateways of the first autonomous system through a connection selected from the group consisting of Ethernet, DSL Modem, and WiMAX.

9. The communication network of claim 1, wherein each designated quality-of-service provider entity is further configured to obtain a view of reachability information.

10. The communication network of claim 1, wherein each designated quality-of-service provider entity is further configured to provision resources among the autonomous systems and build possible paths of data flow therein.

11. The communication network of claim 1, wherein each designated quality-of-service provider entity is further configured to determine an appropriate path and to perform Connection Admission Control for connections to be established.

12. The communication network of claim 1, wherein each designated quality-of-service provider entity is further configured to perform connection aggregation and pre-provisioning of resources.

13. The communication network of claim 1, wherein each designated quality-of-service provider entity is further configured to perform fault management for selected paths.

14. The communication network of claim 13, wherein the fault management includes monitoring and recovery.

15. The communication network of claim 1, wherein each designated quality-of-service provider entity is further configured to provide one or more services selected from the group consisting of accounting services, authorization services, authentication services, and billing services.

16. A method for establishing an end-to-end quality-of-service connection between a first user and a second user in a communication network having a plurality of interconnected autonomous systems including at least a first autonomous system connected to the first user and a last autonomous system connected to the second user, each autonomous system having a designated quality-of-service provider entity and a plurality of gateways, the designated quality-of-service provider entity being a technology-independent entity and having information of resources of its respective autonomous system, the method comprising:
(a) receiving a signal from the first user by the designated quality-of-service provider entity of the first autonomous system requesting a data flow from the first user to the second user satisfying a set of quality-of-service requirements;

(b) inquiring by the designated quality-of-service provider entity of the first autonomous system of the designated quality-of-service provider entities of other autonomous systems to determine a path for the data flow from the first user to the second user satisfying the set of quality-of-service requirements; and (c) reserving and establishing the determined path based on underlying technologies of the gateways and a set of predefined quality-of-service parameters.

17. The method of claim 16, wherein the designated quality-of-service provider entities are modeled using Routing Control Platform.

18. The method of claim 16, wherein receiving a signal from the first user comprises using Session Initiation Protocol.

19. The method of claim 16, wherein inquiring by the designated quality-of-service provider entity and reserving and establishing the determined path utilize signaling according to Next Steps in Signaling (RFC-4080).

20. The method of claim 16, wherein the gateways are technology dependent.

21. The method of claim 16, wherein the designated quality-of-service provider entities control the gateways through signaling protocols selected from the group consisting of Simple Network Management Protocol, Telnet, and Common Open Policy Service (RFC-2748).

22. The method of claim 16, wherein the designated quality-of-service provider entities provide connection aggregation by mapping connections onto preprovider tunnels.

23. A method for establishing an end-to-end quality-of-service connection between a first user and a second user in a communication network having a plurality of interconnected autonomous systems including at least a first autonomous system connected to the first user and a last autonomous system connected to the second user, each autonomous system having a designated quality-of-service provider entity, a plurality of gateways, and a plurality of nodes, each node being coupled to at least one of the gateways, the designated quality-of-service provider entity being a technology-independent entity and having information of resources of its respective autonomous system, the method comprising:

(a) receiving a signal from the first user by the designated quality-of-service provider entity of the first autonomous system requesting a data flow from the first user to the second user satisfying a set of quality-of-service requirements;

(b) inquiring by the designated quality-of-service provider entity of the first autonomous system of the designated quality-of-service provider entities of other autonomous systems to determine a path for the data flow from the first user to the second user satisfying the set of quality-of-service requirements; and (c) reserving and establishing the determined path based on underlying technologies of the gateways and the nodes and a set of predefined quality-of-service parameters.

24. The method of claim 23, wherein the nodes are technology dependent.

25. The method of claim 23, wherein each designated quality-of-service provider entity is further configured to communicate with the nodes of its respective autonomous system using Session Initiation Protocol.

26. The method of claim 23, wherein the nodes and the gateways of each autonomous system interact using Internet protocols.

27. A method for establishing an end-to-end quality-of-service connection between a first user and a second user in a communication network having a plurality of interconnected autonomous systems including at least a first autonomous system connected to the first user and a last autonomous system connected to the second user, each autonomous system having a designated quality-of-service provider entity and gateways, the designated quality-of-service provider entity having information of resources of its respective autonomous system, the method comprising:

(a) the designated quality-of-service provider entity of the first autonomous system receiving a signal from the first user requesting a connection from the first user to the second user satisfying a set of quality-of-service requirements;

(b) the designated quality-of-service provider entity of the first autonomous system communicating with the designated quality-of-service provider entities of other autonomous systems to determine a path from the first user to the second user through at least a subset of the autonomous systems that satisfies the set of quality-of-service requirements, the path being determined using a technology-independent layer; and (c) establishing a data flow between the gateways of the subset of the autonomous systems, the data flow being established using a technology dependent layer.

* * * * *